UNITED STATES PATENT OFFICE.

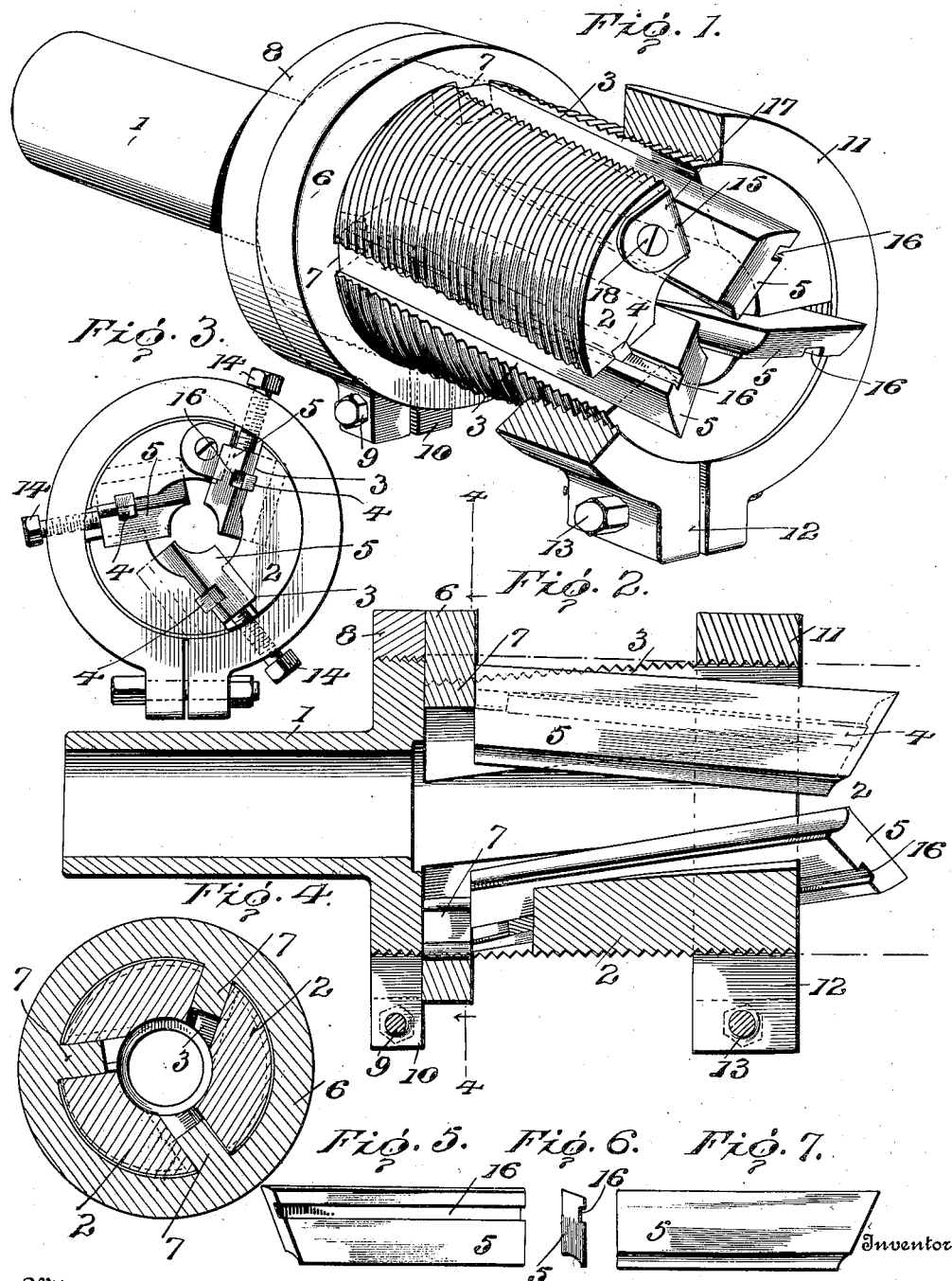

BARNARD WONDERLY, OF CANTON, OHIO.

MILLING-TOOL.

No. 887,992.　　　Specification of Letters Patent.　　Patented May 19, 1908.

Application filed March 16, 1907. Serial No. 362,746.

*To all whom it may concern:*

Be it known that I, BARNARD WONDERLY, a citizen of the United States, residing at Canton, in the county of Stark and State of Ohio, have invented certain new and useful Improvements in Milling-Tools; and I do hereby declare that the following is a full, clear, and exact description of the same, reference being had to the annexed drawing, making a part of this specification, and to the numerals and figures of reference marked thereon, in which—

Figure 1 is a perspective view of the milling tool. Fig. 2 is a vertical section of the same. Fig. 3 is an end elevation. Fig. 4 is a transverse section on the line 4—4, Fig. 2. Figs. 5, 6 and 7, represent views of one of the cutters.

The present invention has relation to milling tools, and it consists in the novel arrangement hereinafter described, and particularly pointed out in the claims.

Similar numerals of reference indicate corresponding parts in all the figures of the drawing.

In the accompanying drawing, 1 represents the shank, which is provided with a hollow head 2, which head is screw threaded upon its outer periphery, and is formed of sufficient size to provide sufficient room to connect the various cutters, and to hold the same in fixed adjustment. The head 2 is provided with a series of longitudinal slots 3, which slots are located at an angle to the axial line of the head and shank and are so located for the purpose hereinafter described. The longitudinal slots are open at the end of the head, and serve to divide the latter into a series of segments. Upon one face or wall of each slot 3 is located the protruding rib 4, which protruding rib may be formed separate and connected or seated in a groove or which may be formed integral with the head. The rib 4 is formed of a length to correspond substantially with the length of the slots. The ribs 4 are located at an angle to the axial center of the head or in other words are inclined toward the axial center of the head as they approach the front end of the head and are so located for the purpose of causing the cutters 5 to move in a path at an angle to the axial line of the head.

It will be understood that as the cutting ends of the cutters 5 are worn away by use and by the proper sharpening of said cutters, the length of the cutters vary from time to time and in order to maintain at all times and under all circumstances the same distance of the cutters at their cutting points from their common center the ribs 4 are inclined as above described.

It will be understood that in milling tools it is of importance that the same diameter be maintained, so that the finished work will have a pre-determined diameter.

It is well understood that in milling tools of this class the cutters should have a shear action upon the metal, and for this purpose the cutters are located at an angle to an axial line and by providing the angled slots 3 I am enabled to bring the cutters into such a position that their cutting ends will be at an angle to the shoulder upon which the cutting ends of the cutters come in contact during the time the head together with the cutters is rotated.

It will be understood that in the formation of bolts or any other product where it is necessary to reduce the diameter of a certain portion of the stock, the stock is fed against the ends of the cutters or the head may be given a forward movement if desired, the only object being that there be a relative longitudinal movement as between the stock and the cutters. In use the cutters are set to cut to a given diameter, which may be an inch, half inch or any other size within the limits of the adjustment of the cutters, which adjustment may be brought about by different width of cutters, and each cutter of a given set or size properly connected to the head.

It will be understood that the cutters must be held against any relative movement as between the head 2, and the cutters 5, and in order to hold the cutters against any endwise movement the collar 6 is provided, which collar is provided with the inward extending lugs 7, which operate in the longitudinal slots 3, and the rear ends of the cutters 5 abutted against the lugs 7. For the purpose of holding the collar in fixed adjustment, together with the cutters 5, the ring 8 is provided, which ring is screw threaded upon its inner periphery, and when located upon the head 2, and rotated it will move upon the head in opposite directions, reference being had to the direction of rotation. After the ring 8 has been brought into proper adjustment it is clamped by means of the clamping bolt 9, which clamping bolt passes through the flanges 10. For the purpose of providing for the clamping of the ring 8 it must of course be cut so as to allow the flanges 10 to be brought toward each other, and the diameter of the ring reduced.

It will be understood that the cutters must be held in a fixed position with reference to the head so that there will be no loose movement as between the cutters and the head and in order to provide for this, the contractible clamping ring 11 is provided with the lugs 12 through which lugs the clamping bolt 13 passes. The clamping ring 11 is screw threaded upon its inner periphery, so that it may be adjusted to any desired point upon the head 2. In Fig. 3 I have shown set screws 14, which set screws are for the purpose of providing means for clamping the cutters in addition to the clamping action of the ring 11, but I do not desire to be confined to the set screws 14, owing to the fact that in most instances the clamping ring 11, will sufficiently bind the cutters so that there will be no relative movement as between the cutters, and the head.

It will be understood that by setting the cutters at an incline to the axes of the head that the distance between the inner edges of the cutters will increase in distance from their cutting ends toward their rear ends, thereby providing sufficient clearance for all purposes and holding the cutters out of contact with the stock, except at the point where they are brought into action or cutting points. It will also be understood that by inclining the slots or cutting the slots at right angles to the inclination of the cutters a shear cut is produced, or in other words by providing the compound angle of the cutters with reference to the axial line of the cutter head, I provide for the proper clearance, and a shear cut.

When it is desired to insert cutters of less thickness than the width of the slots 3, the liners 15 are employed, so as to properly hold the cutters 5, regardless of their width, which cutters must be provided with the grooves 16, which grooves receive the ribs 4, and for the purpose of causing the cutters to follow the inclination of the ribs the grooves are formed parallel with the cutters. By inclining the slots 3 as above described and locating the cutters therein, said cutters will be located spirally to an axial line of the head, and by inclining the ribs 4 and protruding them from the faces of the walls of the slots, and by forming the grooves 18 parallel with the cutters, said cutters will be inclined from the axial line of the head or in other words, a compound inclination of the cutters is produced.

When the cutters are placed in position, the bolt 13, is tightened and ring 11, compresses the segments and binds the cutters securely in the slots, and when the bolt 9, is tightened the cutters are held against longitudinal displacement.

For the purpose of holding the liners 15 in proper position after they have been set, they are provided with the flanges 17, which flanges are connected to the head 2 by means of the screws 18, or their equivalents.

Having fully described my invention what I claim as new and desire to secure by Letters Patent, is—

1. In a milling tool, the combination of a head, a series of slots formed in the head, one wall of each slot provided with a protruding rib, cutters provided with grooves formed parallel with the cutters and the ribs inclined outwardly from the axial line of the cutter, and adapted to be seated in the grooves, an abutting collar provided with lugs and the lugs located in the slots, a clamping ring adapted to hold the collar in fixed adjustment and in contact with the rear end of the cutter, and means for binding the cutters to the head, substantially as and for the purposes specified.

2. In a milling tool, the combination of a head formed with slots at an angle to the axial line of the head, cutters located in the slots below the periphery of the head, grooves and ribs formed between the walls of the slots and the cutters, said ribs being inclined in a plane at right angles to the plane of the inclination of the slots, and a clamping ring on the head to compress the head and thereby hold the cutters.

3. In a milling tool, the combination of a head formed with a series of longitudinal slots, cutters located in the slots, an abutting collar provided with lugs which operate in the slots, means for holding the collar in fixed adjusted position, and means for clamping the cutters in the head.

4. In a milling tool, the combination with a hollow head formed with horizontal slots through the walls thereof and open at the ends, cutters fitting in the slots and extending inwardly beyond the walls thereof, and means for forcing the segments formed by the slots inward to clamp the cutters.

5. In a milling tool, the combination with a hollow externally threaded head formed with slots adapted to receive cutters, an internally threaded contractible element engaging the threaded head, and means for contracting the internally threaded element to compress the segments of the head formed by the slots.

6. In a milling tool, the combination with a hollow externally threaded head formed with longitudinal slots adapted to receive cutters, a split threaded ring engaging the threaded head, and means for clamping the split threaded ring to compress the segments of the head formed by the slots.

7. In a milling tool, the combination with a hollow head having open ended slots, of an abutment mounted on the head and having adjustable threaded connection with said head, a split threaded ring engaging the threaded head, and means for clamping the ring.

In testimony that I claim the above, I have hereunto subscribed my name in the presence of two witnesses.

BARNARD WONDERLY.

Witnesses:
 JOHN H. SPONSELLS,
 F. W. BOND.